United States Patent
Heller et al.

[11] 3,742,266
[45] June 26, 1973

[54] LIQUID COOLED ROTOR FOR DYNAMOELECTRIC MACHINES

[75] Inventors: Paul R. Heller, Murrysville; Sui-chun Ying; James E. Luzader, both of Monroeville, all of Pa.

[73] Assignee: Westinghouse Electric Corporation, Pittsburgh, Pa.

[22] Filed: Sept. 21, 1971

[21] Appl. No.: 182,367

[52] U.S. Cl. .................................. 310/54, 310/51
[51] Int. Cl. ............................................ H02k 9/20
[58] Field of Search ................ 310/54, 58, 59, 61, 310/62, 63, 64; 417/435

[56] References Cited
UNITED STATES PATENTS

| | | | |
|---|---|---|---|
| 2,527,878 | 10/1950 | Fechheimer | 310/54 |
| 3,571,634 | 3/1971 | Sato | 310/54 |
| 2,803,764 | 8/1957 | Lundskow | 310/54 |
| 3,097,317 | 7/1963 | Fechheimer | 310/54 |
| 3,626,717 | 12/1971 | Lorch | 310/54 |
| 3,476,961 | 11/1969 | Heard | 310/58 |
| 2,847,149 | 8/1958 | Ainsworth | 417/435 |
| 2,931,314 | 4/1960 | Erikson | 417/435 |

*Primary Examiner*—R. Skudy
*Attorney*—A. T. Stratton and F. P. Lyle

[57] ABSTRACT

A liquid cooled rotor for dynamoelectric machines in which a coolant liquid such as water circulates through passages in the rotor winding and is discharged through an axial bore and radial passages in the rotor shaft, with a vent tube extending through at least one of the radial passages for venting air or other gases from the region of the rotor axis.

3 Claims, 3 Drawing Figures

LIQUID COOLED ROTOR FOR DYNAMOELECTRIC MACHINES

BACKGROUND OF THE INVENTION

The present invention relates generally to the cooling of dynamoelectric machines, and more particularly to a liquid cooled rotor for machines of large size such as turbine generators.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen, which fills the gas-tight housing and is circulated by a blower on the rotor shaft through the ducts of the stator and rotor windings and through ducts of the stator and rotor windings and through ducts in the stator core.

The maximum ratings required in large generators have continued to increase, however, making it necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding, and a considerable improvement in cooling has thus been obtained. A substantial further improvement can be obtained by applying liquid cooling to the rotor by circulation of a suitable liquid such as water through passages in the rotor windings.

Many problems are involved, however, in circulating a liquid coolant through the rotor of a large generator. In one desirable type of construction, the water or other coolant liquid is introduced into the rotor along the axis of the shaft at one end and flows through an axial passage and radial passages to an annular distribution chamber on the surface of the rotor, from which the liquid is distributed to individual conductors of the rotor winding. The liquid flows through passages in the winding conductors and at the other end flows to an annular collecting chamber on the rotor surface. The liquid is discharged from the collecting chamber through radial passages to an axial bore at the center of the shaft and flows axially through the bore to another set of radial passages through which it is discharged from the rotor.

The radial discharge passages provide a strong self-pumping action, and it is necessary to restrict the flow of water through these passages in order to control the rate of flow of coolant through the rotor and to maintain the pressure high enough to prevent cavitation. The water is preferably treated and recirculated in a closed system after being discharged from the rotor, but it can become contaminated with air, or possibly other gases, and carry such air with it into the rotor. The water is of course heavier than the air and the centrifugal force on the water in the radial discharge passages is correspondingly greater. The water pressure due to this force and to the restriction of flow mentioned above is such that any gas entrained or otherwise carried by the water is forced toward the axis of the shaft and tends to accumulate there or to be discharged in large bubbles. This entrapment of air or other gas in the region of the axis of the rotor is highly undesirable as it can cause unbalance and vibration of the rotor, and tends to reduce the area available for water flow in the axial bore of the shaft as well as having a tendency to cause unstable water flow. Axial vents in the inlet area of water cooled rotors have been proposed for venting air, as in the Fechheimer U.S. Pat. No. 2,527,878 and 3,097,317, but such vents are not suitable for venting entrapped air at the discharge end of the rotor.

SUMMARY OF THE INVENTION

In accordance with the present invention, means are provided for venting gases from the region of the shaft axis at the discharge end of the rotor. As indicated above, it is necessary to restrict the flow of liquid through the radial discharge passages, and for this purpose each radial passage has a plug member closing its outer end with an orifice in the plug member to control the flow of liquid through the passage. A vent tube is mounted in at least one of these plugs and extends through the discharge passage into the axial bore of the shaft to vent air or other gas from the region of the rotor axis. In this way a simple and reliable vent means is provided which effectively vents air or other gas and prevents any accumulation of air in the discharge passages.

BRIEF DESCRIPTION OF DRAWINGS

The invention will be more fully understood from the following detailed description of an illustrative embodiment, taken in connection with the accompanying drawings, in which.

DESCRIPTION OF THE PREFERRED EMBODIMENT

Figure 1:
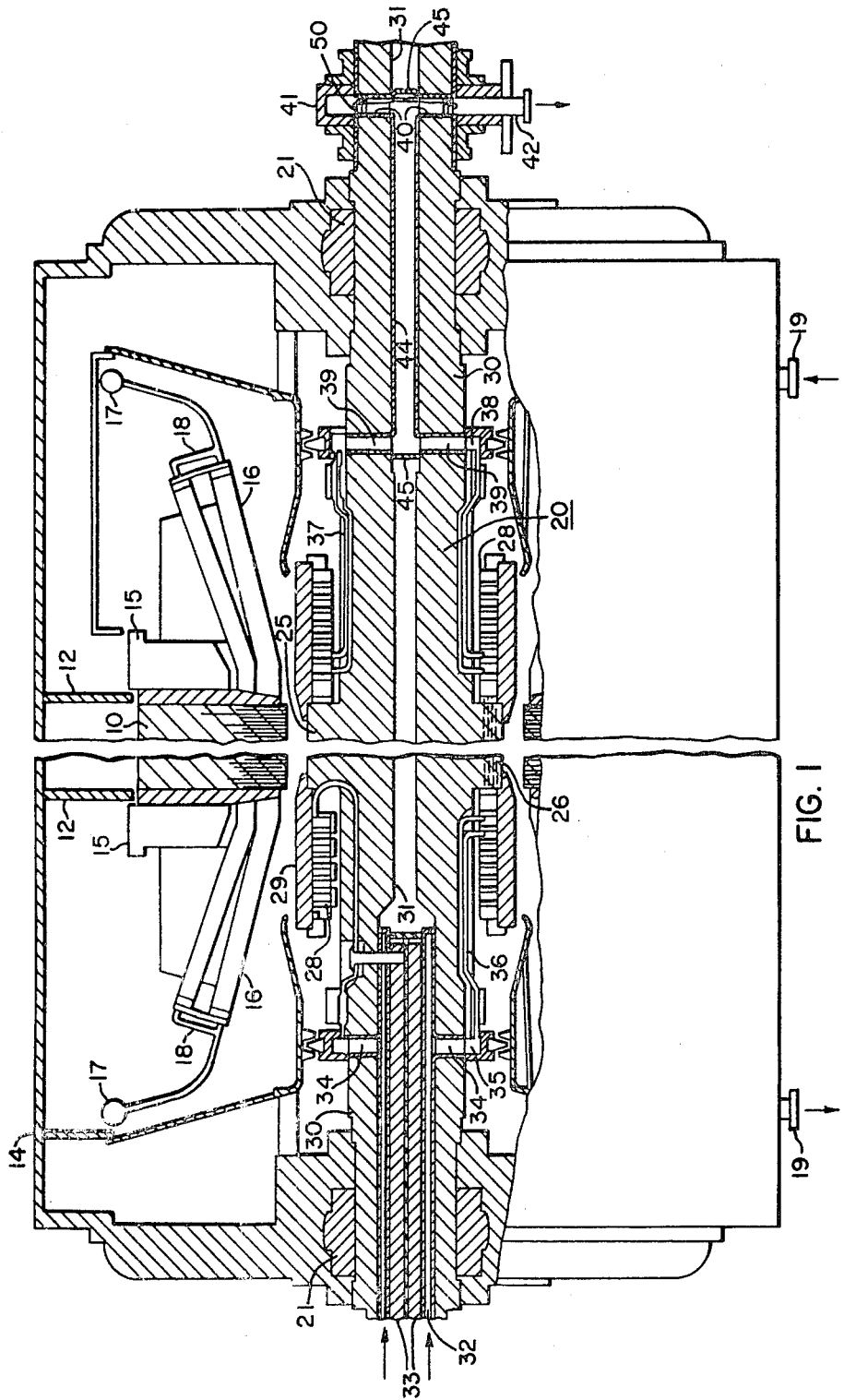
FIG. 1 is a view in longitudinal section and partly in elevation of a turbine generator having a liquid cooled rotor embodying the invention.

Referring first to FIG. 1 of the drawing, the invention is shown embodied in the rotor of a large turbine generator of typical construction, although it will be understood that the rotor of the present invention may be used in machines of any desired type. As shown, the generator has a stator core 10 supported by frame rings 12 in a substantially gas-tight outer housing 14. The stator core 10 is of the usual laminated construction, having a generally cylindrical bore therethrough, and the laminations are clamped between suitable end plates 15 in the usual manner. The stator core 10 has longitudinal slots in its inner periphery for the reception of a stator winding 16, which may be of any suitable type but which is shown as a liquid cooled winding. For this purpose circular inlet and discharge manifolds 17 are provided at opposite ends of the machine and connected through suitable means, generally indicated at 18, to circulate a coolant liquid such as water through the coils of the stator winding 16. The manifolds 17 may be connected as indicated diagrammatically at 19 to an external recirculating system of any desired type.

The housing 14 is filled with a coolant gas, preferably hydrogen, which is circulated through the interior of the housing to cool the stator core by flowing through cooling ducts, and suitable baffling of any desired type may be provided in the housing to direct the flow of gas therein.

The machine has a rotor member 20 which is disposed in the bore of the stator core 10 and supported in bearings 21 in the ends of the housing 14. The bearing assemblies preferably include gland seals to prevent leakage of gas along the rotor shaft, and may be of any suitable or usual construction but have not been illustrated in detail as they are not a part of the invention. The rotor member 20 has a central body portion 25 which is provided with peripheral slots in the usual manner for the reception of a rotor winding 26. The winding 26, which constitutes the field winding of the generator, may be arranged in any suitable manner in the slots of the rotor to form the desired number of magnetic poles, usually either two or four in machines of this type. The winding 26 is constituted of copper conductors which extend longitudinally through the slots of the rotor body 25 and generally circumferentially in the end turn portion 28, which lie beyond the ends of the body portion 25 and are supported against rotational forces by the usual heavy retaining rings 29. The conductors of the rotor winding are hollow or have central passages extending through them for flow of coolant liquid from one end of the winding to the other. Any suitable or desired type of flow pattern may be utilized and any desired type of electrical circuit may be used.

The rotor 20 shown in the drawing is a liquid cooled rotor of the construction more fully disclosed and claimed in a copending application of L. P. Curtis et al., Ser. No. 144,050, filed May 17, 1971, and assigned to the assignee of the present invention. The rotor 20 has shaft portions 30 extending axially from each end of the body portion 25 and preferably integral therewith. The rotor has a central axial bore 31 which, in accordance with usual practice, may extend for the entire length of the rotor from one end to the other. As more fully described in the above-mentioned copending application, a coolant liquid, preferably water, is introduced through the shaft portion 30 at the left-hand end, as viewed in the drawing, and flows through an annular passage 32 in the bore 31. The passage 32 is preferably formed of concentric stainless steel tubes and surrounds axial electrical leads 33, which provide electrical connection to the rotor winding 26. The water flows through the passage 32 to opposed radial passages 34 which extend into an annular distribution chamber 35 on the surface of the rotor shaft 30. Water is distributed from the annular chamber 35 by means of hydraulic connectors 36 of any suitable type to the individual conductors of the rotor winding, the connections being made to the end turns 28.

The water flows through the hollow conductors of the rotor winding to the other end and is discharged through similar connectors 37 to an annular collecting chamber 38 on the shaft 30 at the right-hand end of the rotor. The water flows from the chamber 38 through two opposed radial passages 39 to the bore 31 of the shaft and axially through the bore 31 to opposed radial passages 40 which extend to the surface of the rotor shaft 30. The water is discharged through these passages 40 into a stationary discharge chamber 41 which is provided with suitable seals to prevent escape of the water, and the water is discharged through a drain 42, preferably to be treated and recirculated in a closed system.

All passages and surfaces exposed to the coolant and preferably lined or covered with stainless steel, or other corrosion resistant material, to prevent corrosion of the rotor steel by the heated coolant water. In particular, at the discharge end of the rotor, the axial bore 31 is lined with a stainless steel tubular liner 44 which extends between the two sets of radial passages 39 and 40 and which is closed at each end by a plate or plug 45 of any suitable type welded or otherwise secured in the ends of the liner 44 with a liquid-tight joint. The passages 39 and 40 are similarly lined with tubular stainless steel liners 46 welded or otherwise sealed to the tubular liner 44 of the shaft bore. Any other suitable corrosion resistant material might of course be utilized instead of stainless steel if desired.

As previously discussed, it is possible for the coolant water flowing through the external system to entrain or pick up air, or possibly other gases, and carry such air with it into the rotor. At the discharge end, relatively high centrifugal forces exist in the water flowing radially outward through the discharge passages 40 and the water pressure is such that any air or gas in the water is forced toward the axis of the shaft where it tends to accumulate. This is a very undesirable effect as the air accumulating or trapped at the axis of the shaft tends to reduce the area available for water flow through the bore 31 and can cause unbalance and vibration of the rotor. The trapped air also has a tendency to escape intermittently in large bubbles and may cause instability of water flow. In accordance with the present invention, vent means are provided for venting this air to the surface of the rotor to prevent the undesirable effects resulting from the presence of appreciable amounts of air trapped in the region of the rotor axis.

Figure 2:
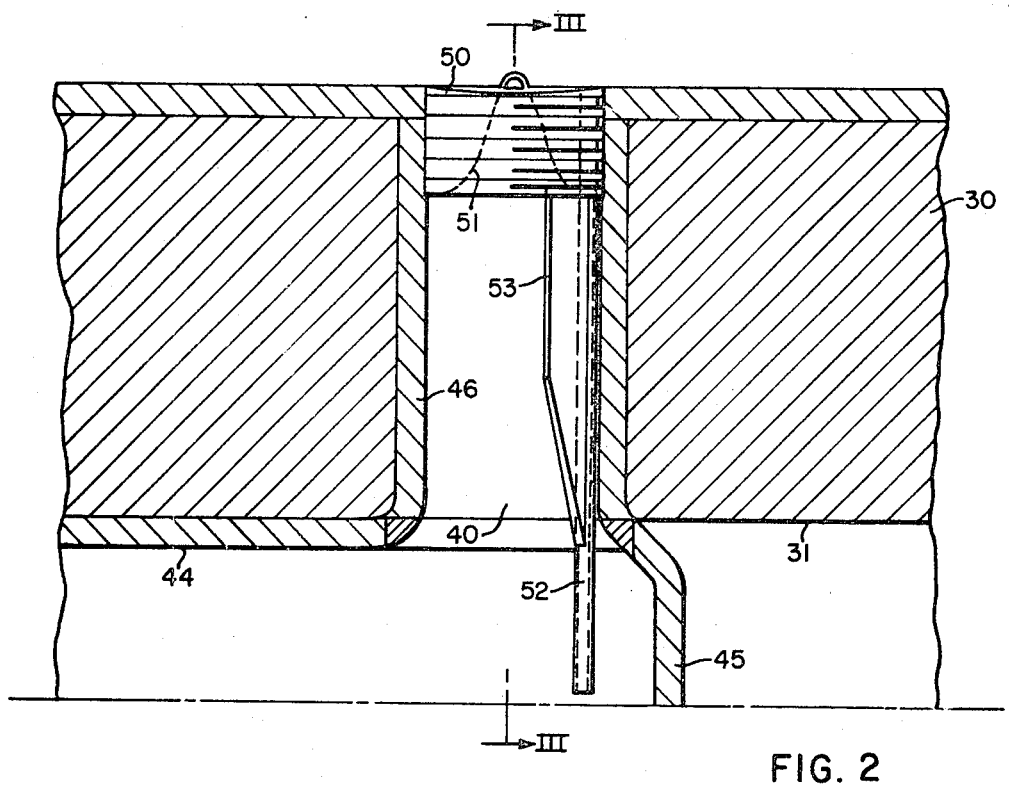
FIG. 2 is a fragmentary longitudinal sectional view at the discharge end of the rotor shaft showing one of the discharge passages.
Figure 3:
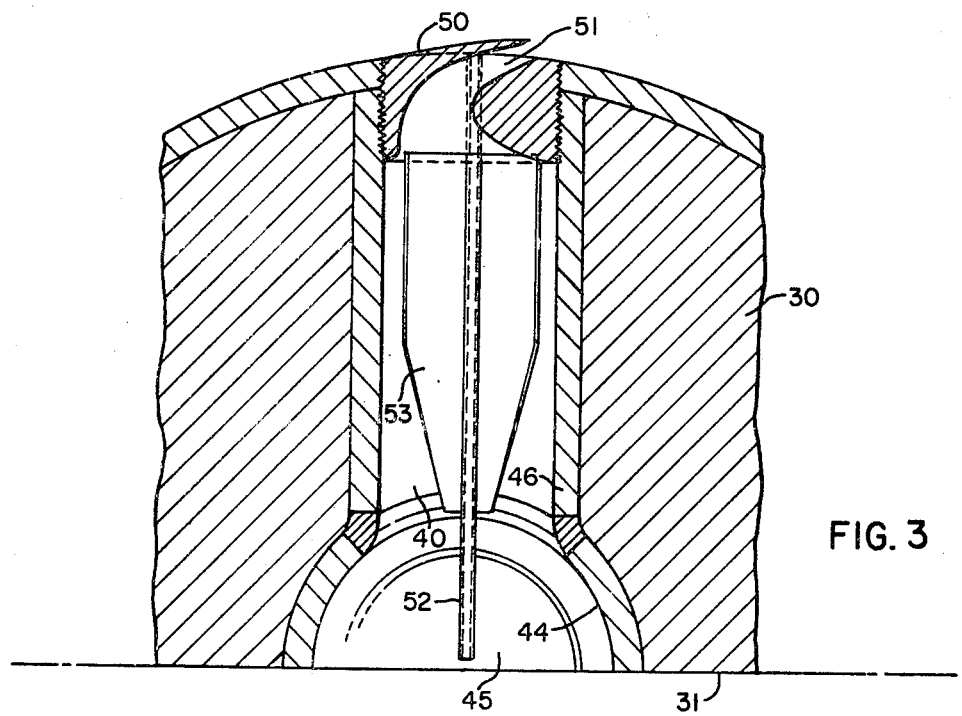
FIG. 3 is a fragmentary transverse sectional view substantially on the line III—III of FIG. 2.

As previously mentioned, it is necessary to restrict the flow of water through the discharge passages 40 in order to control the flow rate through the rotor and to prevent cavitation. For this purpose a plug member 50 is secured in each of the passages 40 at its outer end adjacent the surface of the rotor shaft 30. The plugs 50 may be threaded into the corrosion resistant liners 46, as shown in FIGS. 2 and 3, or they may be secured in the ends of the passages 40 in any other desired liquid-tight manner. As more fully disclosed and claimed in a copending application of L. P. Curtis et al., Ser. No. 182,368, filed Sept. 21, 1971 and assigned to the assignee of the present invention, each of the plugs 50 has an orifice 51 extending therethrough. The orifice 51 in each plug is curved as shown to change the direction of the water from its radial path and to discharge it in a direction approaching the tangential and opposite to the direction of rotation of the rotor. The orifices 51 restrict the flow of liquid through the passages 40 and thus control the rate of flow of water through the rotor due to the self-pumping action of the passages 40 as well as maintaining high enough water pressure to prevent cavitation.

In accordance with the present invention, vent means are provided to vent any trapped air, or other gas, from the region of the rotor axis. For this purpose a vent tube 52 is mounted in the plug 50. The vent tube 52 may be a suitable length of stainless steel tubing, or other corrosion resistant material, which is open at both ends and extends through the plug 50 to the surface of the rotor. Preferably a steel support member 53 is attached to the inner surface of the plug 50 and extends radially through the passage 40 adjacent the wall of the passage, as shown, so as to present minimum interference to the flow of water. The radially inner end of the support may be tapered as shown for the same purpose. The vent tube 52 extends through the plug 50 and is secured to the member 53 to adequately support the vent tube which may be of relatively small size. In this way the vent tube 52 is protected against damage or distortion by the flow of water and is positioned adjacent the wall of the radial passage 40 so as to minimize any obstruction to the flow of water. The vent tube 52 extends from the outer surface of the rotor to the region of the rotor axis and may approach the center of the bore 31. Thus any gas or air which tends to accumulate in this region can escape through the vent tube 52 to the surface of the rotor where it is within the discharge chamber 41 which is at or slightly above atmospheric pressure. The air reaching this chamber therefore escapes with the water into the external system where it can readily be vented to atmosphere.

Thus a simple and reliable venting means is provided which prevents any accumulation of air or other gases in the region of the rotor axis with the undesirable effects previously discussed. Each of the plugs 50 preferably has a vent tube 52 mounted on it in the manner described and the two vent tubes 52 may be aligned as indicated in FIG. 1, although they need not necessarily be in alignment and may be displaced from each other. A vent tube 52 is preferably provided in each of the plugs 50 although this is not absolutely necessary, and a vent tube may be provided in only one of the plugs if desired, so long as it extends into the region of the rotor axis and is of adequate size to vent any gas that may tend to accumulate there. It will be understood, therefore, that although a particular embodiment of the invention is shown and described for the purpose of illustration, other embodiments and modifications are possible and are within the scope of the invention.

We claim:

1. In a rotor member for a dynamoelectric machine, said rotor member having passages for circulation of a liquid coolant therethrough, said passages including an axial passage and opposed radial passages communicating with said axial passage and extending to the surface of the rotor for discharging liquid therefrom, means for restricting the flow of liquid in said radial discharge passages, and a vent tube extending through at least one of the radial passages, said vent tube being disposed at one side of the radial passage and extending from said axial passage to the surface of the rotor to vent gases from the region of the rotor axis to the surface.

2. The combination defined in claim 1 in which the flow restricting means is a plug member disposed in each radial passage adjacent the rotor surface and having an orifice therethrough, and the vent tube is mounted in at least one of said plug members to extend through the radial passage adjacent to the wall thereof.

3. The combination defined in claim 2 in which said plug member has a support member attached thereto and extending into the radial passage adjacent the wall thereof, and the vent tube is attached to said support member to be supported thereby.

* * * * *